United States Patent [19]

Carlow et al.

[11] 3,879,665

[45] Apr. 22, 1975

[54] DIGITAL FREQUENCY-SHIFT KEYING RECEIVER

[75] Inventors: Earl Fred Carlow, Scottsdale; Harold Garth Nash, Tempe, both of Ariz.

[73] Assignee: Motorola, Inc., Chicago, Ill.

[22] Filed: June 28, 1973

[21] Appl. No.: 374,594

[52] U.S. Cl. ................. 325/320; 178/66 R; 178/88; 325/487; 329/104

[51] Int. Cl. ............................................ H04l 27/14

[58] Field of Search ....... 325/30, 45, 320, 344, 349, 325/487; 178/66 R, 66 A, 67, 88; 179/2 DP, 179/2 E; 329/104, 126, 128

[56] References Cited

UNITED STATES PATENTS

| | | | |
|---|---|---|---|
| 3,543,172 | 11/1970 | Seppeler | 325/320 |
| 3,611,298 | 10/1971 | Jacobson | 325/320 |
| 3,647,967 | 3/1972 | Stein | 325/320 |
| 3,656,064 | 4/1972 | Giles et al. | 325/320 |
| 3,660,771 | 5/1972 | Balugani et al. | 325/320 |
| 3,670,250 | 6/1972 | Fritkin | 325/320 |

*Primary Examiner*—Robert L. Griffin
*Assistant Examiner*—Marc E. Bookbinder
*Attorney, Agent, or Firm*—Vincent J. Rauner; Kenneth R. Stevens

[57] ABSTRACT

A digitally implemented frequency-shift keying receiver receives an input periodic oscillation signal of a first frequency, designated a binary "1" and of a second frequency, designated a binary "0". A unidirectional pulse is generated each time the input signal passes through a reference voltage, either positive going or negative going. The time between pairs of these pulses is measured by starting a free running counter with a first pulse and by stopping and restarting the counter with a second pulse. If the time between two of these pulses is sufficiently long, an up-down counter counts in one direction and if the time is sufficiently short, it counts in the other direction. The up-down counter, by providing a prescribed number of counts in either direction to reach a threshold, effectively filters the input signal. An output stage, responsive to the threshold of the up-down counter, provides either a binary 1 or a binary 0.

6 Claims, 2 Drawing Figures

DIGITAL FREQUENCY-SHIFT KEYING RECEIVER

BACKGROUND OF THE INVENTION

1. Field of the Invention

Frequency-shift keying receivers receive periodic input signals of a first frequency and of a second frequency, providing a binary "1" output in response to the first frequency input and a binary 0 in response to the second frequency input. More particularly, the FSK receiver of this invention handles the incoming signals in digital fashion.

2. Prior Art

In the past, the conversion of an input signal of two different frequencies into output binary 1 or 0 (often referred to as "mark" and "space", respectively) is accomplished in largely analog fashion.

For example, in a well known circuit, a pair of selective bandpass filters are each tuned to one of the two input frequencies. A comparison circuit compares the output energy of the filters and if the energy in the 1 bandpass filter is greater than the energy in the 0 bandpass filter, the output is given as a 1. The converse is true for a 0 indication. This circuitry requires high Q's for each filter and that its parameters remain extremely stable under shock, temperature and vibration conditions. Components required are high precision and therefore expensive. Factory adjustments are required to align the filters and periodic maintenance is performed to keep the center frequency of each properly positioned.

Another approach is the zero crossing detector which relates numbers of zero crossings per unit of time to either a 1 or a 0 output. This circuit is not limited to 0 volts of course, but is applicable to any reference voltage. A linear filter removes the high frequency components from the detected signal and passes only the 1 - 0 data. The output of the filter, however, does not have sharp data transitions and a limiting amplifier or comparator must be added.

A more recent and popular circuit is the phase locked loop which automatically locks onto the received signal and indicates 1 s and 0 s by levels in the control voltage. This circuit requires precision components and the accuracy of the center frequencies designed into the system is in the order of 1 to 5 percent. Also, the output does not have sharp data transitions and a limiting amplifier or comparator is required.

Our invention accurately measures each half period of the cycle of the incoming signal and determines whether the half cycle is a 1 or a 0. A plurality of these half cycles are averaged together via a digital filtering technique to statistically establish that the incoming signal is indeed a 1 or a 0. The need for costly, precision components is greatly reduced and the system accuracy is improved.

BRIEF SUMMARY OF THE INVENTION

A frequency-shift keying (FSK) receiver receives an input, periodic oscillation signal, of a first or a second frequency representing a 1 or a 0, respectively. A threshold detector detects each crossing of a reference potential made by the incoming signal, whether negative or positive going, and provides a pulse for each such crossing. A crystal-controlled oscillator provides accurate clock pulses to a free running counter. The counter starts counting the clock pulses whenever a pulse from the threshold detector is produced. The count is immediately stopped and re-started when another pulse from the threshold detector is produced.

A prescribed count of the counter is translated with the output of the translator serving as a set input to a flip-flop. If the incoming signal is of a higher frequency, the prescribed count is never reached and the flip-flop never set, indicating a 1 frequency. If the input signal is of a lower frequency, the prescribed count is reached and translated, and the flip-flop set, indicating a 0 input. The prescribed count represents the geometric mean between the two input frequencies.

The flip-flop therefore provides a voltage level output representative of a binary 0 when it has been set, the voltage level being used to cause an up-down counter to count in an "up" direction. As each input 0 is received, the counter counts up an additional count until a prescribed threshold is reached. In this manner, digital filtering is effectively provided. In like manner, when a 1 is received at the input, the flip-flop is not set and it provides an output voltage level representative of an input 1. This voltage level causes the up-down counter to count in a "down" direction. Each time a 1 is received at the input, the counter counts down until a negative threshold is reached thus providing an effective filtering action for the 1. Both the positive and the negative thresholds of the up-down counter are decoded, and an output stage whose output is either a first voltage level representative of a binary 1 or a second voltage level representative of a binary 0, is either set or reset determined by the particular threshold.

A primary object of this invention is to provide an FSK receiver which digitally processes incoming analog signals.

Another object is to provide an FSK receiver that digitally filters the incoming analog signal.

Still another object is to provide an FSK receiver that does not require high accuracy components.

Still another object of this invention is to provide an FSK receiver that is susceptible of implementation using integrated circuit techniques.

These and other objects are evident in the detailed description that follows.

DETAILED DESCRIPTION

Figure 1:
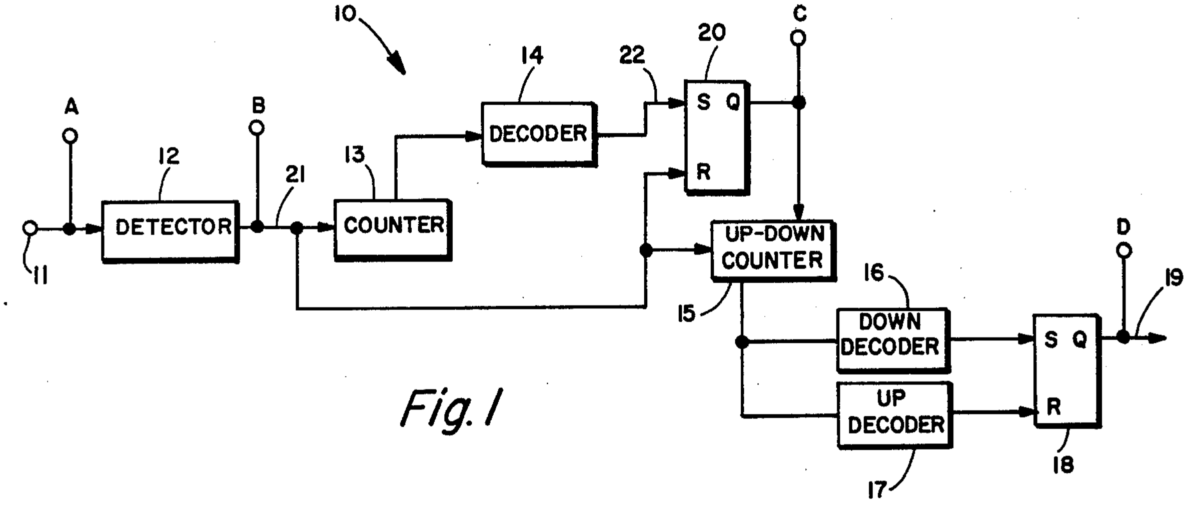
FIG. 1 is a block diagram of the FSK receiver.

The FSK receiver 10 of FIG. 1 is shown in block form. Input terminal 11 is connected to threshold detector 12 to receive input periodic oscillation signals and to produce pulses every time the input signal crosses a reference potential, irrespective of crossing. Threshold detector 12, in the preferred embodiment, is a well known zero crossing detector. The output from threshold detector 12 is connected via line 21 to counter 13. Counter 13 is a binary counter provided with a crystal controlled oscillator to produce pulses for counting. In the preferred embodiment, the crystal controlled oscillator has a frequency of 1 MHz, thereby producing one pulse every microsecond. Counter 13 is of the resettable type and reset each time a pulse from threshold detector 12 is received. An output from counter 13 is decoded by decoder 14. A predetermined count causes decoder 14 to produce an output and to apply that output via line 22 to the set input of flip-flop 20 which in turn supplies an indicia signal, indicating whether the input signal is a 1 or a 0. Output Q of flip-flop 20 serves the indicia signal as a conditioning input to up-down counter 15 which also has an input from threshold detector 12. The reset input to flip-flop 20 comes from threshold detector 12. The up-down counter 15 has a down decoder 16 to provide a set input to flip-flop 18, and an up decoder 17 to provide a reset input to flip-flop 18. The Q output of flip-flop 18 provides the output of the circuit on line 19.

The components all shown in block form in FIG. 1 are all well known, available circuits and need not be described in detail. The description of the operation of the receiver that follows, will further describe the operation of these available components.

OPERATION

Figure 2:
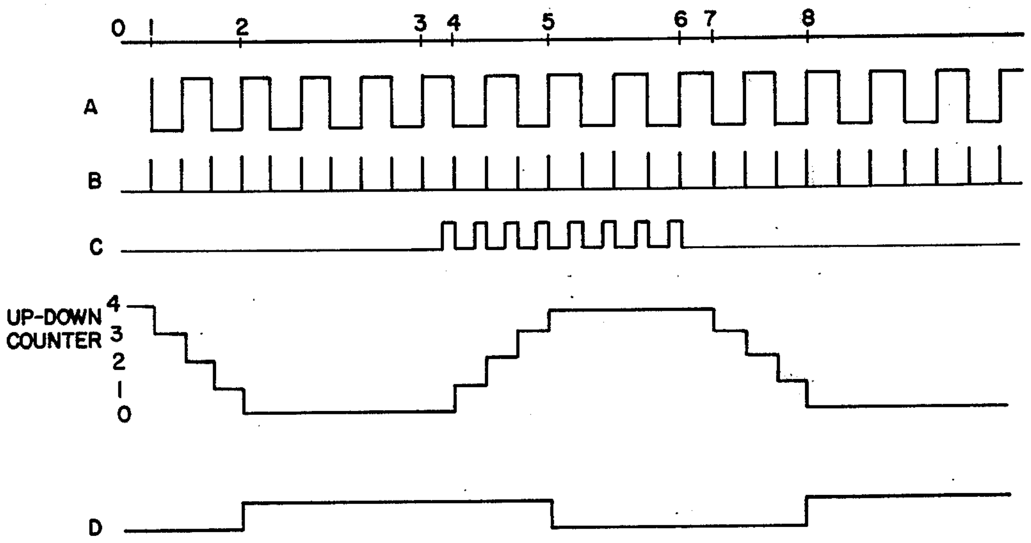
FIG. 2 illustrates idealized waveforms present at various points in FIG. 1.

Referring to both FIGS. 1 and 2, the input periodic oscillation signal is shown as signal A in FIG. 2. Signal A has been shaped and limited by stages not shown but also could be a sine wave having a plurality of cycles at one frequency representative of a binary 1 and having a plurality of cycles of another frequency representative of a binary 0. In the same manner, signal A is shown having a first frequency between times 0 and 3, representing a binary 1, and also referred to as mark frequency. Then from time 3 through time 6 a second, lower frequency is shown representing a binary 0, which is also referred to as "space" frequency. In the preferred embodiment, the 1 frequency is 1270 Hz and the 0 frequency is 1070 Hz.

The plurality of cycles representing a 1 and representing a 0 is dictated by data or bit rates previously established in the industry, together with the frequency ($f_m$) representing the binary 1 and the frequency ($f_s$) representing the 0 frequency. A typical bit rate is in the order of 300 bits per second, which is not intended to be accurately represented by signal A, signal A being merely illustrative.

Signal A is differentiated and rectified by the threshold detector producing a unidirectional pulse at each crossing of a reference voltage, as indicated by signal B. A unidirectional pulse for purposes of this specification is defined as a brief voltage or current excursion in one direction from a reference level. The half cycle period of $f_m$ equals $1/2f_m$ and for $f_s$ equals $1/2f_s$.

In this preferred embodiment, $f_m$ equals 1270 Hz and $f_s$ equals 1070 Hz with corresponding half cycle periods equal respectively, to 393.5 microseconds and 467.5 microseconds (rounded off to the nearest 0.5 microsecond). The geometric mean is the selected point of discrimination and is the square root of the product of 393.5 microseconds and 467.5 microseconds, which equals 429 microseconds. 429 microseconds is used as a threshold setting in the counter 13, which in binary notation equals 110101101. Those binary positions which contain 1's when the number is reached are monitored by decoder 14 which sends out a set signal to flip-flop 20 when all of those bits are 1. When the incoming signal is a 1, however, the counter will never get to a count of 429 because the half cycle period is only 393.5. The counter, as described earlier, counts 1 every microsecond and therefore when the counter reaches a count of 393, another pulse from threshold converter 12 re-starts the counter without it ever having reached a count of 429 and therefore without ever having set flip-flop 20. In the case of a 0 input, the counter reaches 429, resulting in the setting of flip-flop 20. The counter continues to count up to 467 at which time a pulse from the threshold detector 12 restarts the counter and resets flip-flop 20. When the Q output of flip-flop 20 is a 0 as a result of flip-flop 20 not having been set, up-down counter 15 counts down a selected number of counts as shown in the up-down counter curve of FIG. 2. When a count of 4 is made, from 4 to 0, the counter remains at 0 until it receives an up-count command. The up-count command is received when the output Q of flip-flop 20 is a 1 as a result of flip-flop 20 having been set. The C signals of FIG. 2 illustrate the setting and clearing of flip-flop 20 when a 0 signal is received at input 11. When C is a 1 coincidentally with a B signal, the up-down counter is commanded to count up. As can be seen in FIG. 2, the counter counts from 0 to 4 and remains at 4 until commanded to count down by an absence of a C pulse. The up-down counter is, effectively, a digital filter. By setting a threshold count, noise is eliminated. Because of the difference in frequencies between $f_m$ and $f_s$, the count down is not equal in time to that of the count up and therefore there is some bias distortion (exaggerated in FIG. 2 for illustrative purposes). Following is a table of other commonly used FSK frequencies together with the geometric mean for each pair.

TABLE I

FSK FREQUENCY PAIRS

| Frequency | Half Period* | Geometric Mean |
|---|---|---|
| 1070 Hz | 467.5 μsec. | |
| | | 429 μsec. |
| 1270 Hz | 393.5 μsec. | |
| 2025 Hz | 247.0 μsec. | |
| | | 235 μsec. |
| 2225 Hz | 224.5 μsec. | |
| 980 Hz | 510.0 μsec. | |
| | | 465 μsec. |
| 1180 Hz | 423.5 μsec. | |
| 1650 Hz | 303.0 μsec. | |
| | | 286 μsec. |
| 1850 Hz | 270.5 μsec. | |

*Rounded off to ½ μsec.

The down decoder 16 decodes a zero count of the up-down counter 15 and sets the output flip-flop 18. The up decoder 17 monitors the up-down counter 15, in the preferred embodiment for a count of four at which count the flip-flop 18 is reset. The output waveform D on line 19 is shown in FIG. 2.

The particular available circuits used as shown in FIG. 1 are not intended to limit this invention. For example, a zero crossing detector need not be used. The input signal can be differentiated and rectified, producing the signal train B of FIG. 2. The flip-flops may be simple latch circuits and, of course, many counters are available of the reset type and of the up-down type. Decoders are also well known. Therefore, the spirit and scope of this invention contemplates implementation through a wide variety of known circuits.

We claim:

1. A digital frequency-shift keying (FSK) receiver including shaping means for receiving an input periodic oscillation signal of a first frequency, designated a binary 1 and of a second frequency, designated a binary 0, comprising:

a. threshold detector means connected to the shaping means for producing a plurality of unidirectional pulse position signals whenever a positive going or a negative going portion of the periodic oscillation signal passes through a prescribed potential;

b. timing means connected to said threshold detector means for measuring the time between the pulses produced by the detector means to provide indicia signals representative of whether the input signals are of the 1 or 0 frequency; and c. output means connected to said timing means and responsive to the indicia signals for providing on a single output line an output pulse of one polarity if the input signal is at the binary 1 frequency and an output pulse of the opposite polarity if the input signal is at the binary 0 frequency.

2. The FSK receiver of claim 1 wherein said timing means further comprise:

a. resettable counter means connected to said threshold detector means for counting digital pulses of a predetermined frequency in response to a first pulse position signal, and being responsive to a second pulse position signal for resetting to a first predetermined state, said resettable counter means being responsive for generating a counter output signal upon reaching a predetermined count, b. indicia signal generating means connected to said resettable counter means and being responsive to the counter output signal for providing an indicia signal of a polarity representative of a binary 1 upon the generation of a counter output signal, and for providing an indicia signal of a polarity representative of a binary 0 in the absence of a counter output signal.

3. The FSK receiver of claim 1 wherein the output means further comprise:

a. up-down counting means connected to said indicia signal generating means and being responsive to the indicia signals for counting in one direction when the indicia signal represents a binary 1 input signal and in the other direction when the indicia signal represents a binary 0 input signal;

b. threshold decoding means connected to said up-down counting means for providing a first voltage level representative of a binary 1 input in response to a predetermined count from the up-down counting means in one direction, and for providing a second voltage level representative of a binary 0 input in the other direction; and c. bistable output means connected to said threshold decoding means for providing a binary 1 output when set by the first voltage level and a binary 0 ouput when set by the second voltage level.

4. The FSK receiver of claim 2 wherein the output means further comprise:

a. up-down counting means connected to said indicia signal generating means and being responsive to the indicia signals for counting in one direction when the indicia signal represents a binary 1 input signal and in the other direction when the indicia signal represents a binary 0 input signal;

b. threshold decoding means connected to said up-down counting means for providing a first voltage level representative of a binary 1 input in response to a predetermined count from the up-down counting means in one direction, and for providing a second voltage level representative of a binary 0 input in the other direction; and c. bistable output means connected to said threshold decoding means for providing a binary 1 output when set by the first voltage level and a binary 0 output when set by the second voltage level.

5. The FSK receiver of claim 2 wherein the resettable counter means further comprise:

a binary counter for counting the digital pulses, a decoding circuit connected to the binary counter and to said indicia signal generating means for producing a binary counter output signal when the binary counter reaches the predetermined count, and said indicia signal generating means being responsive to said binary counter output signal.

6. The FSK receiver of claim 4 wherein the resettable counter means further comprise:

a binary counter for counting the digital pulses, a decoding circuit connected to the binary counter and to said indicia signal generating means for producing a binary counter output signal when the binary counter reaches the predetermined count, and said indicia signal generating means being responsive to said binary counter output signal.

* * * * *